United States Patent
Byrne et al.

(10) Patent No.: US 7,529,320 B2
(45) Date of Patent: May 5, 2009

(54) FORMAT EFFICIENT TIMING ACQUISITION FOR MAGNETIC RECORDING READ CHANNELS

(75) Inventors: Jason Byrne, Lyons, CO (US); German Feyh, Boulder, CO (US); Jeffrey Grundvig, Loveland, CO (US); Aravind Nayak, Longmont, CO (US); Richard Rauschmayer, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 679 days.

(21) Appl. No.: 11/228,762

(22) Filed: Sep. 16, 2005

(65) Prior Publication Data
US 2007/0064836 A1    Mar. 22, 2007

(51) Int. Cl.
*H04L 27/00* (2006.01)
(52) U.S. Cl. .................................. 375/326; 375/316
(58) Field of Classification Search ................. 375/326, 375/327, 344, 345
See application file for complete search history.

(56) References Cited

U.S. PATENT DOCUMENTS

| | | | | |
|---|---|---|---|---|
| 5,311,545 A | * | 5/1994 | Critchlow | 375/232 |
| 5,471,508 A | * | 11/1995 | Koslov | 375/344 |
| 5,550,869 A | * | 8/1996 | Gurantz et al. | 375/340 |
| 5,793,818 A | * | 8/1998 | Claydon et al. | 375/326 |
| 5,943,363 A | * | 8/1999 | Hanson et al. | 375/150 |
| 6,034,564 A | * | 3/2000 | Iwamatsu | 329/306 |
| 6,307,696 B1 | * | 10/2001 | Bishop et al. | 360/51 |
| 6,621,857 B1 | * | 9/2003 | Belotserkovsky et al. | 375/149 |
| 2006/0256464 A1 | * | 11/2006 | Ozdemir | 360/46 |

* cited by examiner

*Primary Examiner*—Emmanuel Bayard
(74) *Attorney, Agent, or Firm*—Mendelsohn & Associates, P.C.; Yuri Gruzdkov; Steve Mendelsohn

(57) ABSTRACT

A timing recovery circuit for magnetic recording applications that use preamble synchronization bits. The timing recovery circuit uses a modified digital phase lock loop having a digital rotator. An analog to digital converter (ADC) receives an analog input and provides ADC digital samples to the digital rotator. In order to compensate for analog delay and slewing, it is noted that changing the sampling point in the ADC is equivalent to introducing a phase change in the output. This phase change can be introduced much faster digitally, using a digital rotator, for example, than through changing the analog sampling points. The digital rotator snaps to an initial phase estimate almost instantly as compared to the time required to change the ADC sampling points. As the ADC slews to the initial phase estimate, the digital rotator derotates in step until the ADC reaches the initial phase estimate.

21 Claims, 8 Drawing Sheets

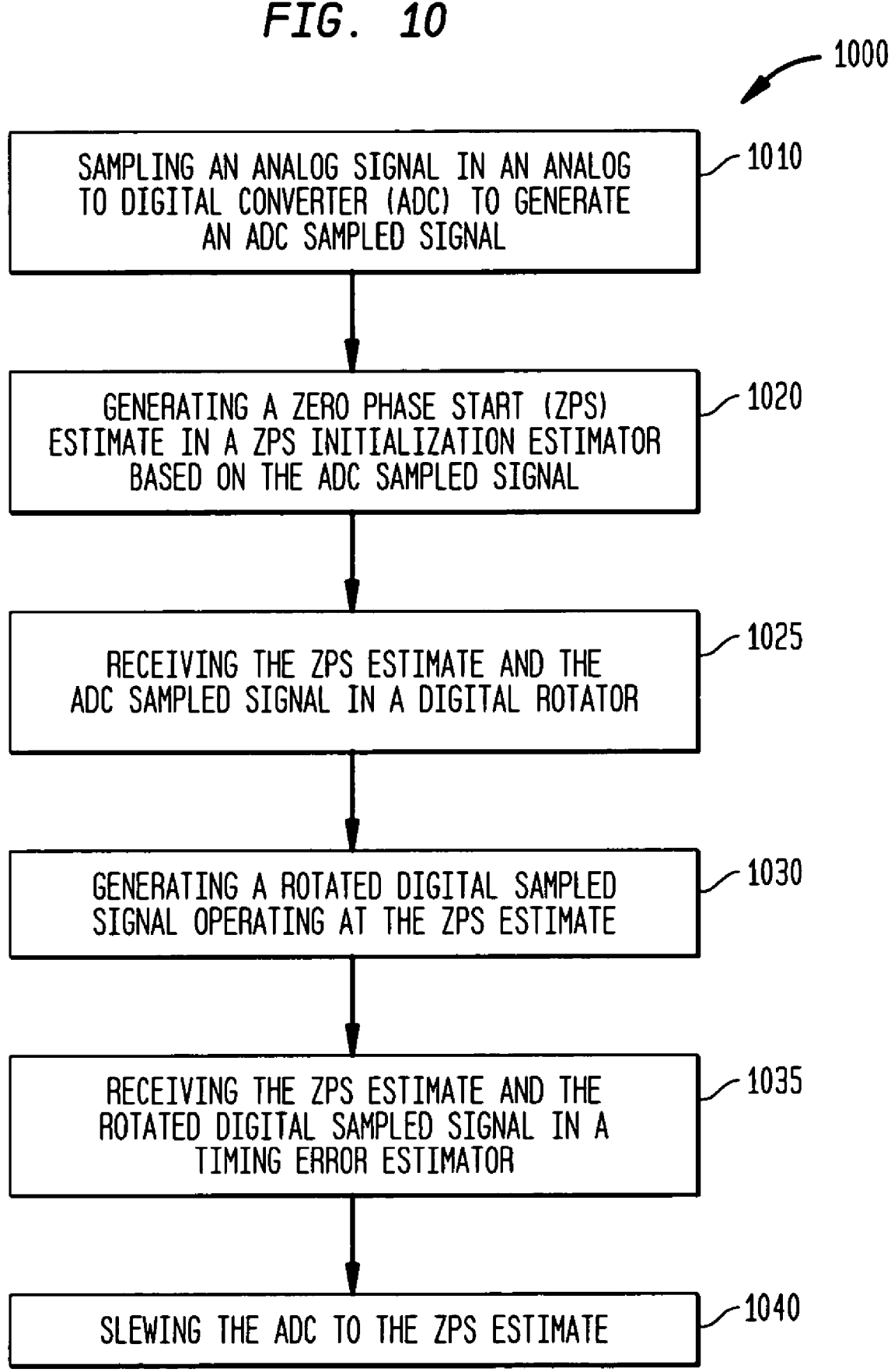

FORMAT EFFICIENT TIMING ACQUISITION FOR MAGNETIC RECORDING READ CHANNELS

FIELD OF INVENTION

The present invention relates generally to improved timing acquisition methods and apparatus, and more particularly, to advantageous techniques for digitally adjusting the output of an analog sampling device to improve the format efficiency and reduce the overhead processing utilized for timing acquisition.

BACKGROUND OF INVENTION

Digital magnetic recording stores digital data by modulating a magnetic flux pattern in a magnetic medium. During the storing process, an electric current in a write head is modulated based on the digital data to be written. The head is positioned over magnetic material in the shape of a circular disk which rotates rapidly. The electric current in the write head, in turn, modulates the magnetic flux pattern in the medium. The medium chosen is such that the flux pattern is retained in the medium after the electric current is turned off in the write head, thus providing data storage.

Data is usually written in the medium in concentric circles called tracks, which are further divided into sectors, with each sector storing a fixed quantity of information. Data and supporting bit patterns required for control and synchronization when reading the data are written into the tracks.

During a read process, a read head is positioned over the medium following the tracks, but now the magnetic flux pattern in the medium induces a current in the read head. This current is then processed to recover the written data. The reading of the signals from the read head uses an analog signal path including filtering, amplification, and timing acquisition stages. The read process begins with the reading of synchronization bit patterns, that contain preamble symbols.

Limitations in the analog portion of the timing acquisition and read signal processing path tend to increase the preamble symbol format overhead in order to achieve good performance in reading magnetically stored digital information.

SUMMARY OF INVENTION

Among its several aspects, the present invention recognizes that there is a need for accurately reading the preamble symbols as quickly as possible, thereby reducing the preamble symbol format overhead. A timing acquisition circuit having a digital rotator may be used to compensate for analog delays and slewing. By way of example, such circuits may be advantageously employed in a read-channel front end of a recording disk drive system.

To these ends, an embodiment of the present invention includes a timing recovery circuit with an analog to digital converter (ADC) controller that samples an analog signal to generate an ADC digital sampled signal. The timing recovery circuit uses a phase initialization estimator which receives the ADC digital sampled signal and generates a phase estimate. A digital rotator is also used in the timing recovery circuit. The digital rotator receives the phase estimate and the ADC digital sampled signal and generates a rotated digital sampled signal operating at the phase estimate. The timing recovery circuit further cooperates with a timing error estimator that receives the phase estimate and the rotated digital sampled signal and slews the ADC controller to the phase estimate.

Another embodiment of the present invention addresses a method of timing acquisition in a disk recording system comprising: sampling an analog signal in an analog to digital converter (ADC) to generate an ADC digital sampled signal; utilizing a zero phase start (ZPS) initialization estimator to generate a ZPS estimate based on the ADC sampled signal; receiving the ZPS estimate and the ADC digital sampled signal in a digital rotator and generating a rotated sampled signal operating at the ZPS estimate.

A more complete understanding of the present invention, as well as other features and advantages of the invention, will be apparent from the following detailed description and the accompanying drawings.

BRIEF DESCRIPTION OF DRAWINGS

FIG. 10 illustrates a flow chart for a timing recovery process using a digital rotator in accordance with the present invention.

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Figure 1:
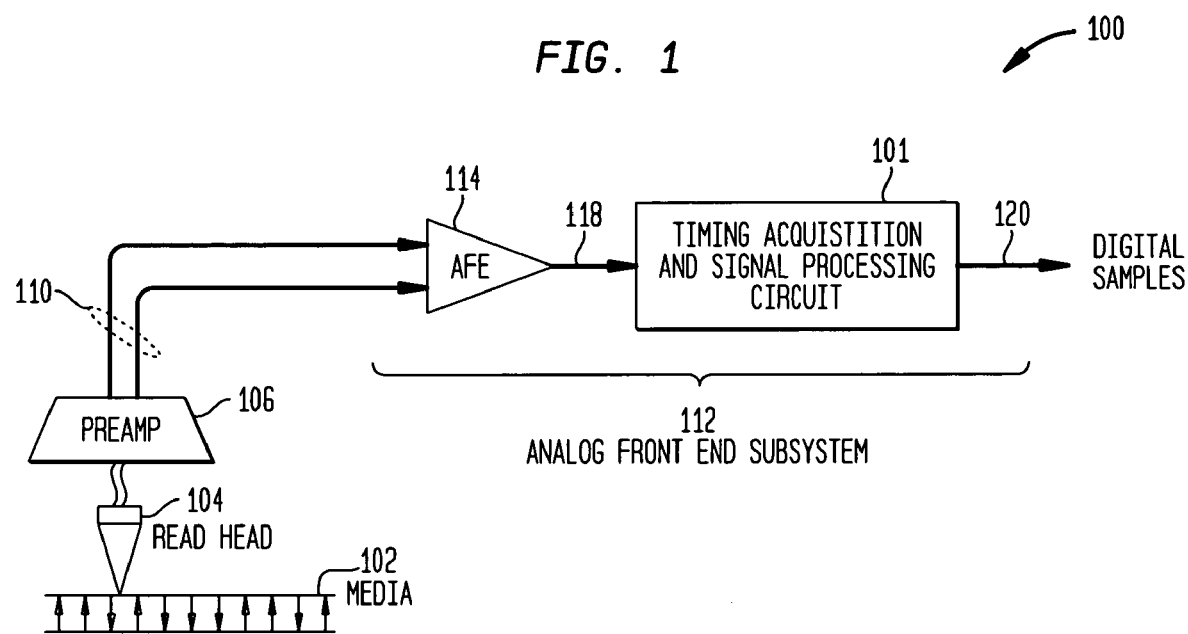
FIG. 1 illustrates an exemplary analog subsystem for a perpendicular recording disk drive system utilizing a format efficient timing acquisition circuit in accordance with the present invention.

FIG. 1 illustrates an exemplary analog subsystem 100 for a perpendicular recording disk drive system utilizing a timing acquisition and signal processing circuit 101 in accordance with the present invention. It will be appreciated that other systems and analog front end subsystems may benefit from the teachings of the present invention. For example, horizontal recording disk drive systems and the like may also benefit from aspects of the present invention.

The requirements of the analog subsystem 100 designed for use in a perpendicular recording disk drive system are significantly more stringent than those for a subsystem for use in conjunction with a horizontal recording technique which is the primary recording technology used in the most common present day disk drives. The perpendicular recording technology stores data in closely packed vertical magnetized units in sectors on a media 102, such as a read/write disk. A read head 104, optimized for perpendicular recorded media 102, senses the vertical magnetized units to produce a signal that is closely coupled to a preamp 106 which provides a first stage of amplification of the read head signal.

At the start of a sector on a disk, synchronization bits are stored that are read and used by a timing acquisition function to prepare for reading data stored in the sector. The preamp 106 is typically located close to the read head 104 and may provide a differential output 110 to drive the amplified signal to an analog front end subsystem 112 which might be suitably located on a disk drive card, for example. An analog front end (AFE) circuit 114 is used to remove most of any DC offset that may be part of the preamp signal and provides an adequate amount of gain so that the amplified signal can be suitably processed by the rest of the front end circuitry. The AFE 114 output 118 connects to a timing acquisition and signal processing circuit 101. The timing acquisition and signal processing circuit 101 may contain, for example, an analog to digital converter (ADC), timing acquisition circuitry, and additional signal processing functions as required by the recording system. The timing acquisition and signal processing circuit 101 generates digital samples 120 that may then be further processed for data capture.

In the analog front end subsystem 100, the reading of synchronization bits can require a significant time penalty due to limitations in the analog read path. Each data sector on the media begins with a set of preamble symbols for synchronization purposes. A readback waveform, as obtained, for example, from a read head 104, is a continuous-time analog waveform, and needs to be discretized or sampled, leading to digital samples that can be processed further. The initial portion of the readback analog waveform corresponds to the preamble bits that were initially written to the sector. Given the high speeds and data densities employed in current hard drives, the goal of this discretization process is to synchronize as accurately and as quickly as possible. This can be accomplished by requiring as few samples as possible, while ensuring that the error rate in reading these samples is within acceptable limits. A timing recovery circuit is responsible for determining the points in time at which the readback analog waveform is sampled.

In each data sector, synchronization bit patterns are written into the medium to aid the read process. These synchronization bit patterns convey no useful information from the end-user's point of view, and thus represent overhead. However, since these synchronization bit patterns are already known during the read process, the readback waveform corresponding to these known synchronization bit patterns can be used to fine tune the system parameters of the read circuit, thus preparing the read circuit for the actual data that follows. The accurate reading of the synchronization bits in a first stage is referred to as timing acquisition. The reading of the actual data stored in a sector during a second stage is referred to as data tracking. The known synchronization bit pattern is usually divided into different sections, with each section having a different name. Each section is used for training different parts of the read circuit. The portion of the synchronization bits that trains a timing recovery device, is referred to as the preamble timing symbols portion. One choice of pattern for the preamble symbols is a 2T-pattern, which ensures that the corresponding readback waveform is a sinusoid having an associated 2T frequency. The 2T-pattern refers to repetitions of a specific pattern, such as, a [1 1 0 0] pattern, which has a transition of 0 to 1 or 1 to 0 every 2T, where T is the time period allocated for every bit.

Figure 2:
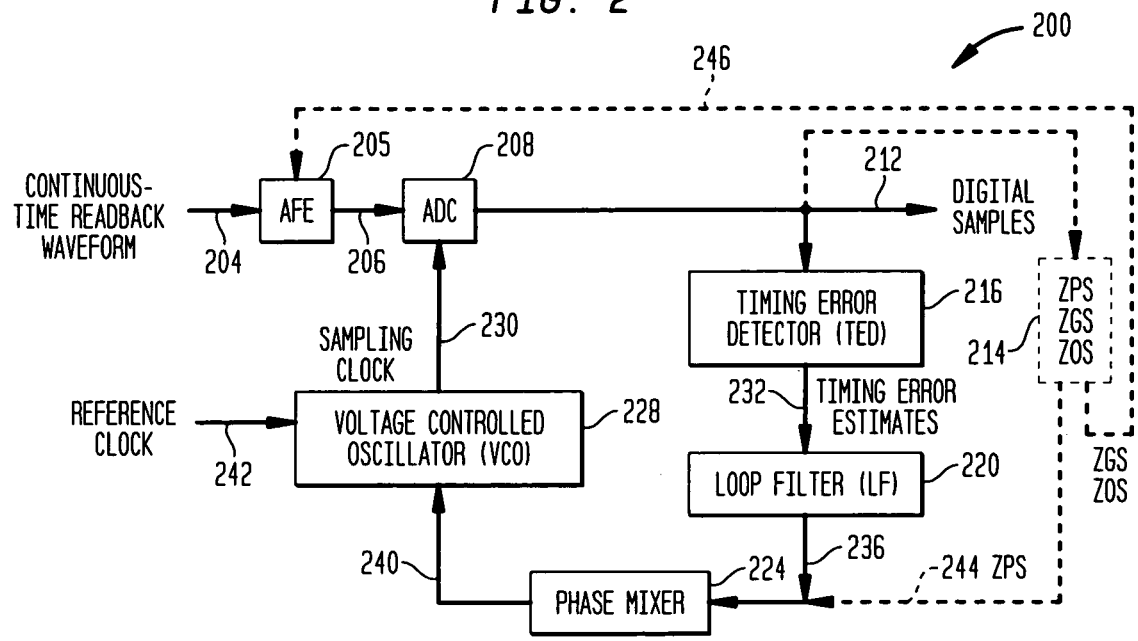
FIG. 2 illustrates a timing recovery circuit based on principles of a phase-locked loop (PLL) in accordance with the present invention.

FIG. 2 illustrates a simplified timing recovery circuit 200 implemented utilizing a phase-locked loop (PLL). The timing recovery circuit 200 receives a continuous time analog readback waveform 204 from a read channel in a magnetic recording device, such as output 110 of preamp 106. The continuous time waveform is an input to an analog front end (AFE) 205 that outputs an offset-corrected and amplified signal 206 to an analog to digital converter (ADC) 208 which then outputs digital samples 212. To construct a PLL for timing recovery purposes, a zero phase start (ZPS), zero gain start (ZGS), and zero offset start (ZOS) unit 214, a timing error detector (TED) 216, a loop filter (LF) 220, a phase mixer 224, a voltage controlled oscillator (VCO) 228, and the ADC 208 are used.

The ADC 208 samples the readback waveform 204 according to a sampling clock 230 from the VCO 228. The digital samples 212 are input to the TED 216 which estimates timing errors in the sampling clock. During the acquisition of the preamble symbols, the TED 216, in effect, uses the preamble symbols to generate expected digital samples. These samples are signal samples that would be expected if there were no timing errors and no channel imperfections. These expected digital samples are then compared to the digital samples actually received, and this comparison leads to an estimate 232 of the timing errors inherent in the digital samples.

This timing error estimate 232 is then passed through the loop filter 220, which may be a low-pass filter, to reduce the sensitivity of the PLL to channel noise. The output of the loop filter 220 is then used by the phase mixer 224 to modulate input 240 to the VCO 228. A reference clock 242 is another input to the VCO 228. The VCO 228 modulates the reference clock based on the input from the phase mixer 240. With an input of 0 volts from the phase mixer 224, the VCO 228 generates a free-running sampling clock 230, where each clock duration is the same as every other one. The input 240 from the phase mixer 224 modulates the instantaneous duration of each clock period of the sampling clock around a nominal value. Sampling of the analog readback waveform by the ADC 208 is triggered by a particular point in each clock duration, for instance, the rising or the falling edge of the clock.

Before the PLL starts to operate in the acquisition mode, the digital samples 212 need to be at approximately the right phase so that the timing error information from the digital samples is useful. Approximate phase synchronization is achieved by an initialization procedure called zero-phase start (ZPS) using the ZPS, ZGS, ZOS unit 214, where the first few digital samples are used to estimate, for example, the phase of the incoming sinusoid, and this estimate is used to initialize the PLL operation. The ZPS estimate 244 provides an initial phase value to the phase mixer 224. The ZGS and ZOS estimates 246 provide the initial gain and offset values for the AFE 205.

Since the preamble symbols represent overhead, to improve data format efficiency, there should be as few of them as practical. The timing recovery circuit 200 described in FIG. 2 uses a digital PLL (DPLL), where the TED 216, the LF 220 and the mixer 224 are in the digital domain. The VCO 228 and the ADC, 208, however, are part of the continuous-time analog domain. Factors such as propagation delays in the analog domain and limitations on how fast the instantaneous phase of the VCO 228 and the ADC 208 can be changed, lead to lower format efficiency. This format inefficiency is mainly due to the ZPS phase estimate that has to be slewed to the ADC 208 according to its speed-of-phase-change limitations. Consequently, these slewed values suffer propagation delays. Only after the ADC 208 is at the phase corresponding to the ZPS estimate 244 can the PLL start to operate in data acquisition mode. Thus, the preamble symbols between the time the ZPS estimate 244 is computed and the time the delayed slewing is completed are generally not used by the timing loop.

Figure 3:
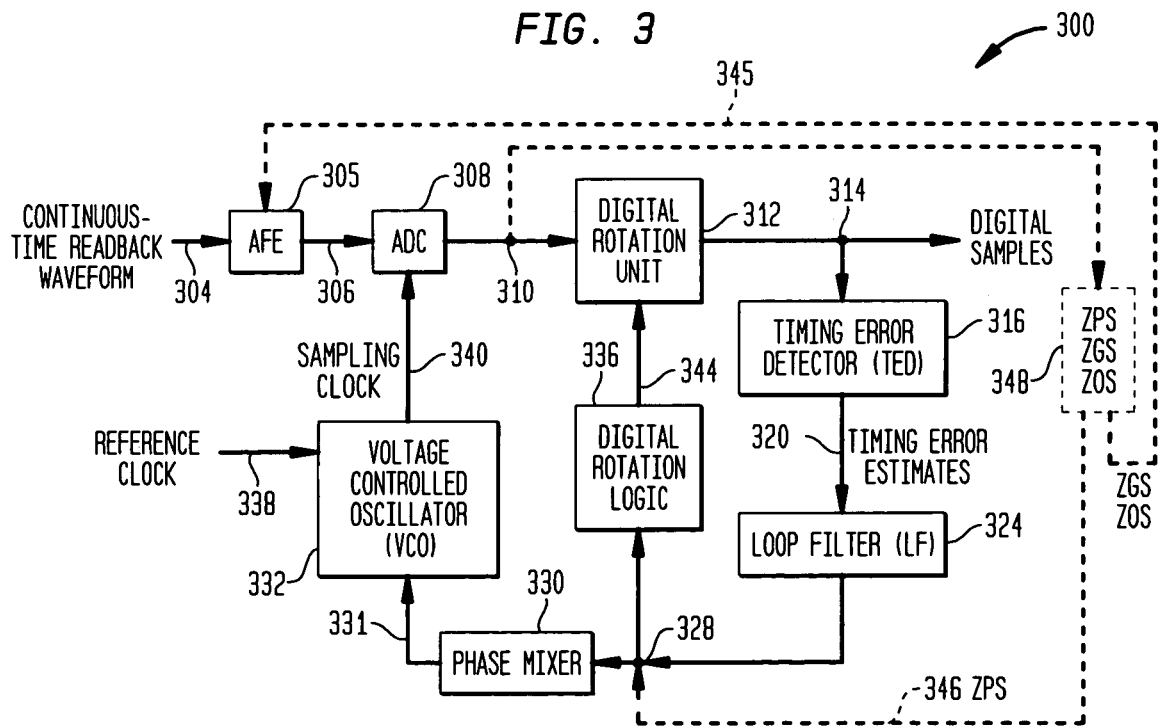
FIG. 3 illustrates a second timing recovery circuit using a modified digital phase lock loop (DPLL) with a digital rotator in accordance with the present invention.

FIG. 3 illustrates a second timing recovery circuit 300 using a modified digital phase lock loop (DPLL) using a digital rotator. The second timing recovery circuit 300 receives a continuous time analog readback waveform 304 in an analog front end (AFE) 305 that outputs an offset corrected and amplified signal 306 to an ADC 308 which provides ADC digital samples 310 to a digital rotator having a digital rotation unit 312 and digital rotation logic 336. Digital samples 314 output by the digital rotation unit 312 are received in a timing error detector (TED) 316 that produces timing error estimates 320 that are input to a loop filter (LF) 324. The loop filter 324 output 328 is received in a phase mixer 330 and processed by the digital rotation logic 336. The phase mixer 330 provides a modulating signal 331 to a voltage controlled oscillator (VCO) 332. A reference clock 338 is an input to the VCO 332. The VCO 332 modulates the reference clock based on the input from the phase mixer 330. The VCO 332 produces a sampling clock 340 which is used in the ADC 308 to control when to sample the input readback waveform 304. The digital rotation logic 336 provides an output 344 to control the digital rotation unit 312.

The second timing recovery circuit 300 provides significant gains in data format efficiency by using additional digital signal processing to compensate for analog delay and slewing. In order to compensate for analog delay and slewing, it is noted that the analog readback waveform 304 is a sinusoidal waveform during acquisition due to the 2T pattern preamble symbols. Therefore, changing the sampling points in the ADC 308 is equivalent to introducing a phase change in the sinusoidal waveform. This phase change can be introduced much faster digitally, using a two-tap filter, for example, than through changing the analog sampling points.

ZGS and ZOS estimates 345 provide the initial gain and offset values for the AFE 305. An initial ZPS estimate 346, produced by ZPS, ZGS, ZOS unit 348, is sent to the phase mixer 330. The ZPS estimate 346 controls the ADC 308 and the digital rotation unit 312. The digital rotation unit 312 snaps to the ZPS phase almost instantly as compared to the time required to change the ADC sampling point. As the ADC 308 slews to the ZPS phase, the digital rotation unit 312 derotates in step, so that the phase of the digital samples 314 at the output of the digital rotation unit 312 remains at the ZPS phase all through the slewing process. Once the ADC 308 is at the ZPS phase, the digital rotation unit 312 is disabled and the timing loop reverts back to operating as a PLL. Thus, timing information can be extracted from the samples that would have been discarded by the timing recovery circuit 200, allowing better format efficiency.

Figure 4:
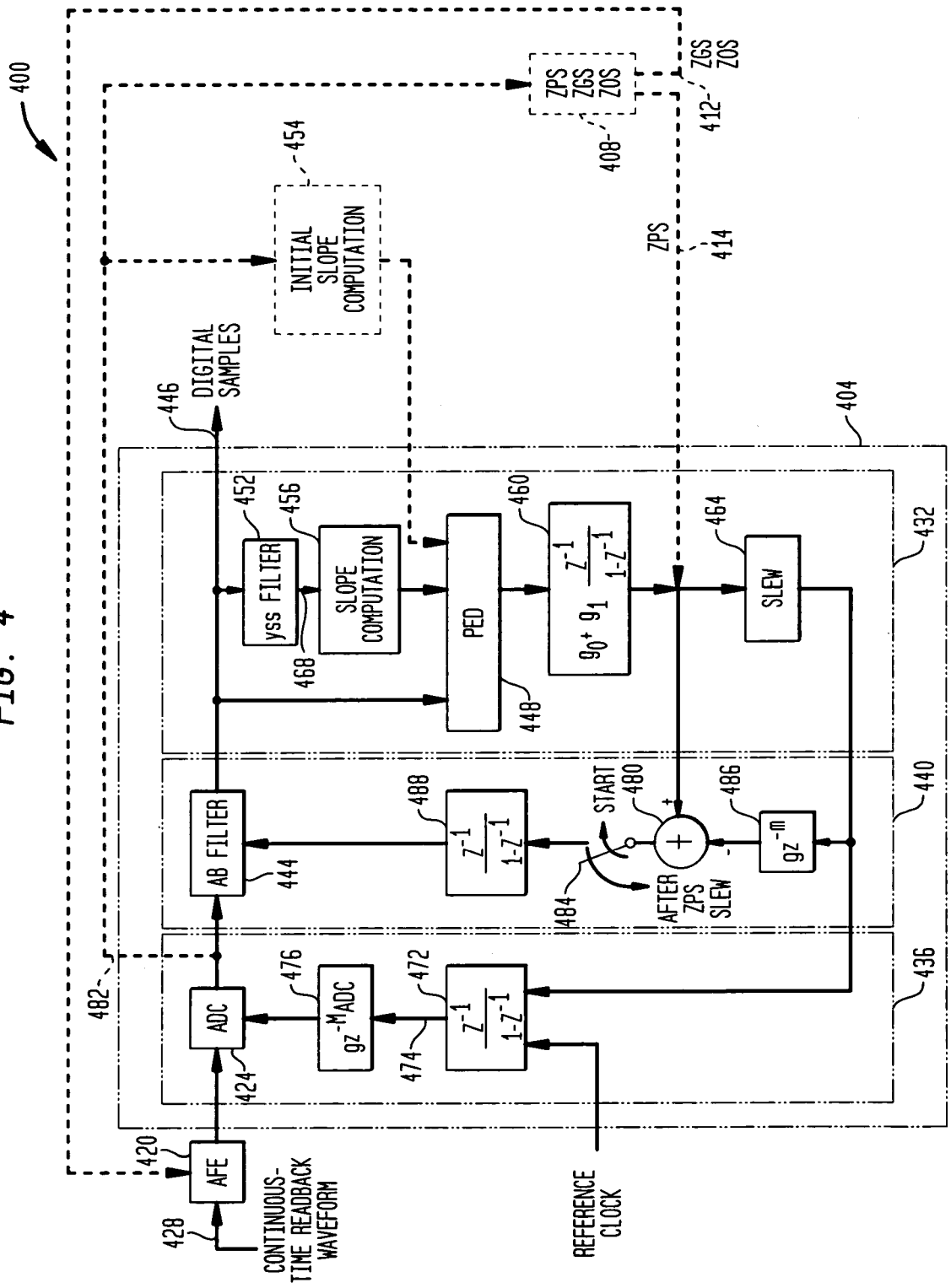
FIG. 4 illustrates a third timing recovery circuit in accordance with the present invention.

FIG. 4 shows a third timing recovery circuit 400. Acquisition loop 404 components and signal paths are shown using solid lines. The components and signal paths shown using dotted lines are zero-phase start (ZPS), zero-gain start (ZGS), zero-offset start (ZOS) unit 408, which is used to set a DC offset and gain in the analog front end (AFE) 420, and also to initialize the phase and slope information in the acquisition loop 404 as explained in further detail below.

Before the acquisition loop 404 starts operation, initial gain and offset settings to be used in the AFE 420 are determined. This initialization is accomplished using ZGS and ZOS estimates 412 as discussed below. The ZGS estimate is generated from an ADC digital sampled signal output 482 from the analog-to-digital converter (ADC) 424. The ZGS estimate is an estimate of the error between an expected amplitude and the amplitude of the 2T sinusoid being received as the continuous time readback waveform 428. The amplitude of the incoming 2T sinusoid is compared with a desired setting, and the resulting error signal is then used to adjust the gain in the AFE 420. The ZOS estimate is generated from the DC offset of the ADC samples, and feeds back the error information to the AFE 420 to reduce the DC offset in the ADC samples. The ZPS estimate 414 is used to initialize the sampling phase that is used in the ADC 424 and digital rotator. The ZPS, ZGS, ZOS unit 408 works in conjunction with the acquisition loop 404 which is described below.

The acquisition loop 404 consists of a timing error estimator 432, an ADC controller 436, and a digital rotator 440 having the form of an AB filter function.

The digital rotator 440 includes an AB filter 444 which is a 2-tap digital filter of the form a+bD, where D is the unit digital delay operator and a and b are coefficients of the digital filter. When responding to samples from a sinusoid input, the AB filter 444 acts as a digital rotator, introducing a phase change of $\phi_{AB}=\tan^{-1}(b/a)$ and a magnitude scaling of $\sqrt{a^2+b^2}$ to its output digital samples 446. The digital samples 446 are an input to the timing error estimator 432 which in turn generates estimates of the timing errors inherent in these digital samples. This timing error information is then used in the ADC controller 436 and the digital rotator 440 to complete the acquisition loop.

The timing error estimator 432 comprises a loop filter 460, a slew-box 464, and a phase error detector (PED) controller having a PED 448, a yss filter 452, and a slope computation unit 456. The timing error estimator 432 receives digital samples 446, an initial slope signal received from an initial slope computation function 454, and the ZPS estimate 414. The PED 448 works with the digital samples 446 from AB filter 444 and slope estimates derived using these samples in the slope computation unit 456 to generate timing error estimates. An initial slope estimate is derived from the ADC digital sampled signal 482 in initial slope computation function 454. These timing error estimates are filtered using a loop filter 460, which is a second-order low-pass filter with gain parameters $g_0$ and $g_1$.

The ADC controller 436 involves analog delays and also has restrictions on how fast the ADC 424 can change its sampling points. The phase change output of the loop filter 460 is slewed and, for example, limited to a range of timing changes that can be stably handled by the ADC, and then provided as an input to a transfer function unit 472 having a phase mixer and voltage controlled oscillator (VCO).

Figure 5:
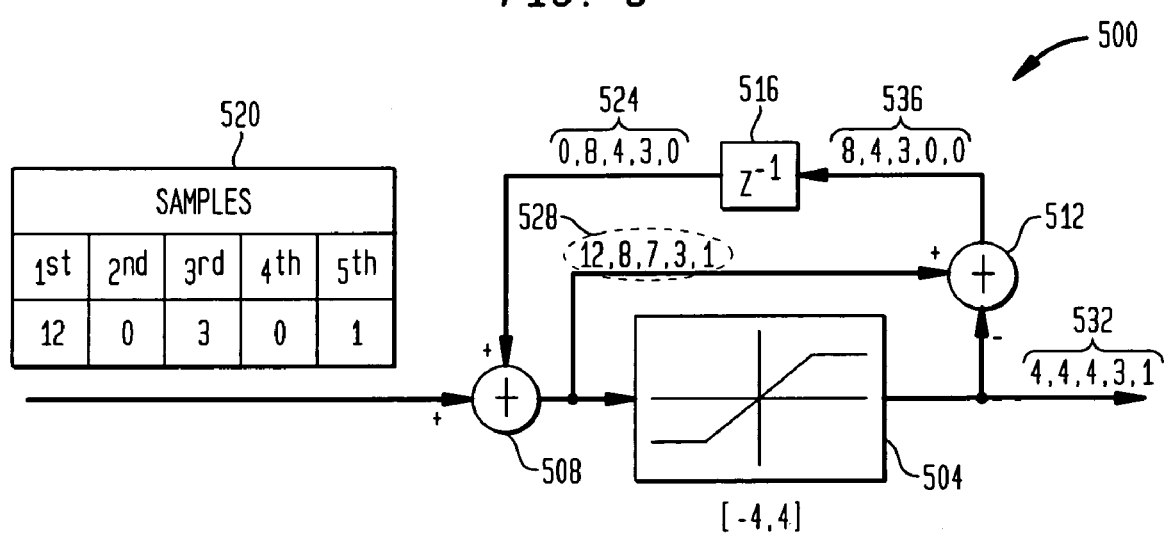
FIG. 5 illustrates an example of a slewing mechanism in accordance with the present invention.

Slew-box 464 can be implemented using an arrangement similar to the one shown in FIG. 5, which shows an example of slewing of an input sequence to meet a requirement that the magnitude of the slewed outputs be limited to less than 4 in magnitude. FIG. 5 illustrates an example of a slewing mechanism 500 implemented by a limiter 504, signal summers 508 and 512, and delay element 516. An input sequence 520 is received at signal summer 508. The input sequence {12, 0, 3, 0, 1} is an ordered sequence of signal samples with 12 as the first sample. Due to the delay element 516, a delay sequence

524 {0, 8, 4, 3, 0} has a first value 0 that is added to the first value of the input sequence 12 to produce a first data value 12 of a first summer sequence 528. The first summer sequence values 528 are limited by limiter 504. The output of the limiter 504 is an output sequence 532 with a first value 4 that is a result of limiting the first input 12 to a 4. The output sequence 532 is summed with the first summer sequence 528 in summer 512 to produce a second summer sequence 536. The second summer sequence 536 has a first value of 12−4=8. A second value 0 in the input sequence 520 is combined with a second value 8 of the delay sequence 524 to produce an 8 as the second value of the first summer sequence 528. This process is followed for the other samples in the input sequence.

The PED 448 uses the AB filter 444 digital samples 446, and slope estimates from the initial slope computation function 454 and slope computation unit 456 to generate timing error estimates, based on a signed least mean squares (LMS) calculation. The slope estimates are generated using the yss filter 452, which is a 8-tap digital filter given by [1,1,−1,−1, 1,1,−1,−1]. The coefficients of the yss filter 452 are samples of a 2T sinusoid, and therefore, the yss filter 452 represents a band-pass filter centered around the 2T frequency. Consequently, the yss filter 452 produces a cleaner version of the incoming samples of the 2T sinusoid by reducing the out-of-band noise contribution. In addition, the yss filter 452 introduces a phase shift of 45° to the digital samples 446.

A goal of the acquisition loop 404 is to align the AB filter output digital samples 446 such that they correspond to the peaks and zeros, which represents the desired sampling phase. Given the high sampling rates in magnetic recording, the timing loop is operated at half the sampling rate. Other sampling rates may be used. For example, with a 40% sampling rate there would be four outputs for every ten time periods. The 40% sampling rate would increase memory requirements in a digital implementation and additionally cause a wait of 10T before the results of the 40% rate cycle can be used for any timing updates. There can be 25% sampling rate implementations as well and the present invention is applicable across all sampling rates. For example, with the 50% sampling rate, the timing updates are computed every 2T, as opposed to every T, T being the sampling rate period.

Every 2T period, two digital samples 446 are generated by AB filter 444. Instead of using both of these digital samples, the timing loop 404 uses one sample, and information from the other sample is used in a gain loop. The rationale for this approach is as follows. The amount of timing information in a sample is related to the slope at the sample location, and therefore, is maximum near zero locations of the sampled signal. Peaks of the sampled sinusoid signal carry almost no timing information. The situation is exactly the opposite for the gain loop, with the peaks carrying maximum amplitude information, and the zeros carrying very little information. Therefore, based on the output 468 of the yss filter 452, peak and zero locations are decided, and the corresponding samples are apportioned between the gain loop and the timing loop respectively. The digital samples 446 from AB filter 444 corresponding to the zero locations are used to form a timing error signal. The expected AB filter output at the zero locations, by definition, is zero, and the AB filter samples at the zero locations are themselves the desired timing error signals. Instead of the actual slope, a binary-quantized version of the slope is used, with the slope being +1 or −1 depending on whether the sample location corresponds to a zero with a positive or a negative slope, respectively. The yss filter method outlined above is used after a total of 8T periods have elapsed from the starting of the acquisition loop 404. The period of 8T is required as this is the time that the 8-tap yss filter 452 needs for it to be filled with valid AB filter 444 digital samples 446. For the first 8T period of acquisition, the slope information is gathered based on accumulators used for the ZPS computation. Further details for ZPS computation in accordance with the present invention are provided below.

The ADC controller 436 takes the timing error estimates from the timing error estimator 432 and uses the timing error estimates to change the ADC 424 sampling point. The transfer function unit 472 generates sampling points based on the timing error estimates. These sampling points 474 then propagate through analog and digital delays represented by the $gz^{-M_{ADC}}$ block 476 and finally change the sampling phase of the ADC 424. The gain g is chosen with consideration of the ADC 424 maximum-rate-of-phase-change. For the system described, a g=1/64 may be suitably used. Another goal of acquisition is to have the ADC sampling phase and frequency reach the desired values before data tracking begins.

The delays in the ADC controller 436, as specified by the value $M_{ADC}$, and the slewing requirements of the ADC 424 have direct impact on the format efficiency of the data stored on the magnetic medium. The timing error estimator 432, and hence the acquisition loop 404 itself, directs the operation of the AB filter 444 to the phase determined by the ZPS estimate 414. As a consequence, between the instant a ZPS estimate is computed and the time when the ADC 424 output digital sampled signal 482 corresponds to the ZPS phase estimate, the preamble symbols can be used by the acquisition loop 404 due to the use of the digital rotator 440.

The digital rotator 440 is used as an additional and faster means of adjusting the phase of the 2T-sinusoid samples that are used by the timing error estimator 432. The AB filter 444 is used to introduce a phase change specified by the ZPS estimate 414. Since the digital rotator 440 is in the digital domain, a phase change due to the AB filter 444 precedes a phase change due to the ADC 424. Also, a digital phase rotation can be performed with minimum slewing restrictions. Since the ADC 424 and the AB filter 444 are both used to introduce the ZPS phase change, care needs to be taken to ensure that the total phase change seen by the timing error estimator 432 corresponds to the ZPS estimate 414 to avoid double-counting the timing errors.

Such correspondence is ensured by the following arrangement. The ZPS estimate 414 is used to quickly rotate the phase of the AB filter 444 digital samples 446, and begin slewing the ADC 424. As the slewed sampling points 474 change the ADC sampling phase, the AB filter 444 is de-rotated in step, so that, the AB filter 444 digital samples 446 stay at the desired ZPS phase. This approach ensures that the timing error estimator 432 operates correctly, and therefore, the acquisition loop 404 can be operated while the ADC 424 slews. The delay in the digital rotator 440, specified in gain delay block 486 with a delay m, is a design parameter and should be matched as closely as possible to the delay $M_{ADC}$, as specified in the gain delay block 476, that occurs in the ADC controller 436. The design parameter m may be programmable so that it can be changed to adapt to different conditions. The gain g in both blocks 476 and 486 may be, for example, set to the same value.

After the ADC 424 is slewed to the ZPS phase estimate, the AB filter 444 is back at an initial configuration. To avoid any errors due to finite precision during the various computations in the digital rotation of the AB filter, coefficients of the AB filter 444 are loaded with their initial values after the ADC 424 has been slewed to its proper operating point for data tracking, and kept fixed for the rest of acquisition. To simplify the implementation, a look-up table implementation of the AB filter 444 could be used instead of explicit rotation of the AB filter by a fixed function implementation, such as might be provided by a specific multiplier architecture. A programmable version using a digital signal processor (DSP) may also be used. The look-up table could be constructed with the filter coefficients indexed by the different phases of the corresponding AB filter configurations spanning a (0,2π) range. The current AB filter coefficients (a1, b1), for example, are used in the look-up table to fetch a corresponding phase, such as phase1. The fetched value phase1 is added to the desired phase change to obtain a new phase value, phase2. Then the look-up table is used again, but this time in the other direction, to fetch the new filter coefficients (a2, b2) corresponding to the phase2 value.

The AB filter rotation method described here is independent of how the initial phase of the AB filter is chosen. One choice for the initial phase is to have the AB filter 444 initialized such that its phase is zero. However, it is useful in many cases to have a non-zero initial phase for the AB filter 444 to ensure that when the data tracking loop takes over from the acquisition loop, there is no need for any phase jump. The signal paths from the ADC 424 to the timing error estimator 432 are usually different for the acquisition and the data tracking loops, and these paths might introduce different phases. During acquisition, the desired form of the input sinusoid signal is the peak-zero form, whereas during data tracking, the desired phase is specified by other system parameters such as an equalization target and filters chosen for the data tracking loop. The initial phase of the AB filter 444 can be chosen taking these factors into account.

The following discussion describes the loop initialization functions including further details of the ZPS, ZGS, ZOS unit 408 and also the method used to obtain slope estimates for the first 8T periods of acquisition. The dotted line functions of FIG. 4 represent the processing that needs to be done for initialization of the timing recovery circuit 400. For example, in a rotator initializer, summer switch 484 is closed during initialization to allow the ZPS estimate 414 to provide an initial value. The ZPS estimate 414 is connected to summer block 480 which subtracts the output of the gain delay block 486 from the ZPS estimate providing a rotator control signal that is connected to the integrator 488 whose output controls the AB filter 444. Until the ZPS slew is complete, the AB filter phase is adjusted by the timing error estimator 432. Once the ZPS slew is complete the summer switch 484 is opened and the ADC directly takes over responsibility for making any phase changes. When the switch is opened, the integrator 488 has a zero volt input applied and the AB filter rotation is disabled. The summer switch 484 is switched after a predetermined number of clock cycles after the ZPS estimate is computed. The actual number of clock cycles is chosen based on estimates of the analog and digital delays.

Figure 6:
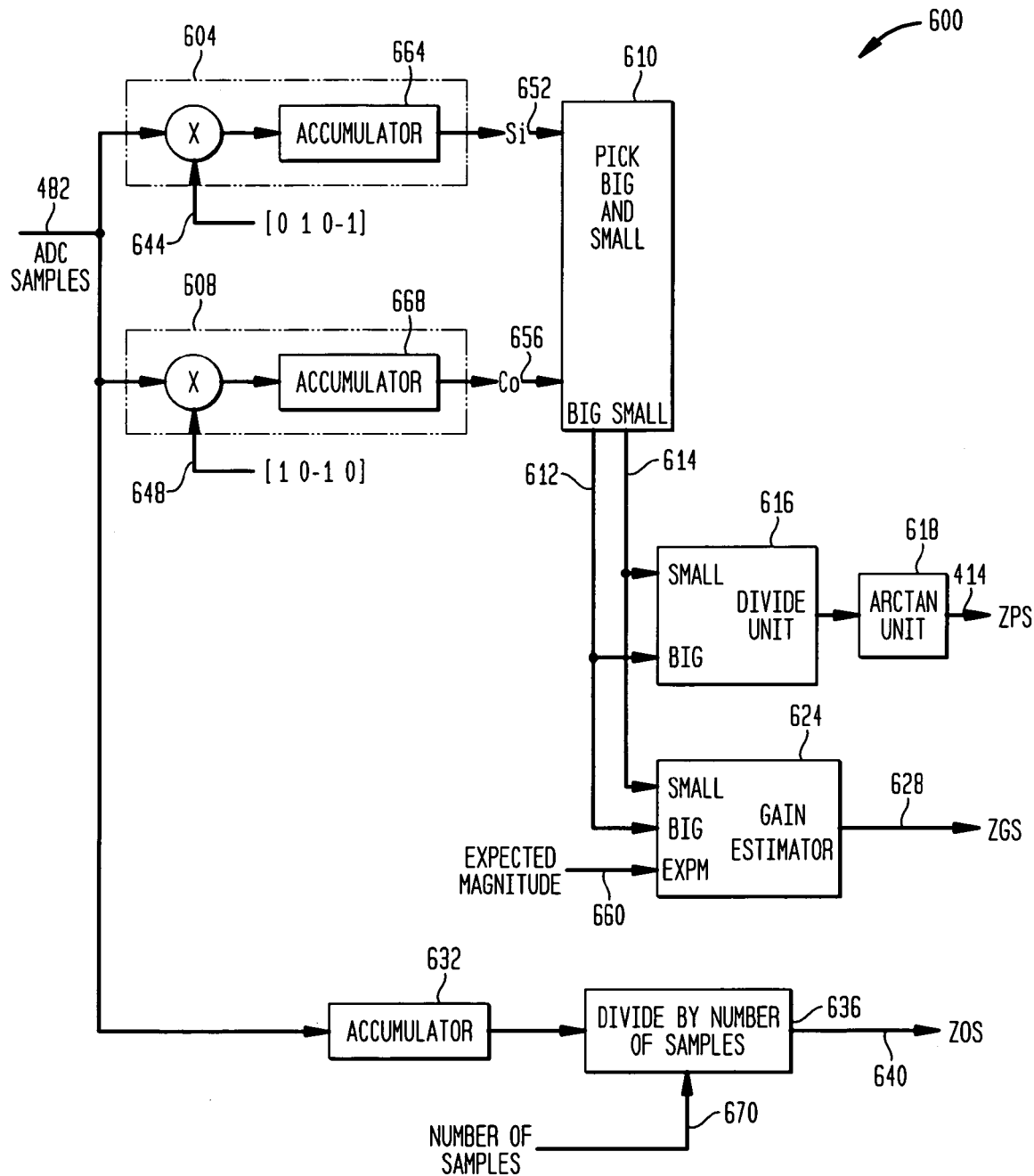
FIG. 6 illustrates a block diagram of a zero phase start (ZPS) estimator, a zero gain start (ZGS) estimator, and a zero offset start (ZOS) estimator in accordance with the present invention.

FIG. 6 shows a block diagram of a ZPS, ZGS, ZOS unit 600 used to initialize the timing recovery circuit 400. The ZPS, ZGS, ZOS unit 600 uses two correlators 604 and 608, a pick big and small circuit 610 producing an output big signal 612 and an output small signal 614, a divide circuit 616 and arctan circuit 618 producing a ZPS estimate 414, a gain estimator 624 producing ZGS estimate 628, an accumulator 632 and a divide by number of samples circuit 636 producing ZOS estimate 640.

The ZPS estimate 414 is used as an estimate of a required phase change such that the AB filter 444 digital samples 446 are in the desired peak-zero form. One method of estimating the required phase change uses the AB filter 444 digital samples 446 in order to estimate the phase of the sinusoid. With this approach, it is necessary to wait for an AB filter memory to be filled and also for the AB filter 444 digital samples 446 to be valid, which may minimize format efficiency. The AB filter uses samples of a present and a previous input to generate a present output. Keeping track of the previous samples at the present sample point necessitates the use of a memory in the AB filter. This wait delay can be eliminated by using the ADC 424 output digital sampled signal 482 to estimate the phase of the sinusoid at the output of the ADC 424 and then accounting for the phase rotation introduced by the AB filter 444.

It is important to note that the AB filter output needs to reach the peak-zero form, and not necessarily to a zero phase form. In other words, after changing the phase of the AB filter 444 corresponding to the ZPS phase estimate 414, the phase of the AB filter 444 digital samples 446 only needs to be one of $\{0, \pi/2, \pi, 3\pi/2\}$. Therefore, the desired ZPS phase change is the difference between the phase of the AB filter output signal and the nearest among these phase points. This observation greatly reduces the size of the look-up tables needed for hardware implementation.

The incoming ADC 424 output digital sampled signal 482 is first correlated by baud-rate samples of a sine and cosine respectively, both at a nominal 2T frequency. Due to the baud-rate sampling, the sine and the cosine correlation sequences are then periodic version of [0,1,0,−1] 644 and [1,0,−1,0] 648, respectively. The corresponding correlators 604 and 608 have outputs 'si' 652 and 'co' 656, respectively. The maximum a posteriori (MAP) estimate of the phase of the sinusoid at the ADC 424 output digital sampled signal 482 is then given by $$\theta_{ADC} = \tan^{-1}\left(\frac{si}{co}\right).$$

The phase shift due to the AB filter 444 is $\phi_{AB}$. Therefore, the phase of the signal at the AB filter 444 digital samples 446 is $$\theta_{AB} = \theta_{ADC} + \phi_{AB}.$$

Defining z=x mod(y$_1$, y$_2$) such that x=z+N(y$_2$−y$_1$), where N is an integer and y$_1$<z<y$_2$, the ZPS phase change is then given by $$\theta_{ZPS} = \theta_{AB} \bmod(-\pi/4, \pi/4).$$

Hardware implementation can be simplified by recognizing that $$\theta_{ZPS} = (\theta_{ADC}^1 + \phi_{AB}^1) \bmod(-\pi/4, \pi/4),$$

where $\theta_{ADC}^1 = \theta_{ADC} \bmod(-\pi/4, \pi/4)$, and $\phi_{AB}^1 = \phi_{AB} \bmod(-\pi/4, \pi/4)$.

Therefore, it is sufficient to construct look-up tables that allow phase estimation modulo (−π/4, π/4). A pick big and small unit 610 selects the larger of the two values si 652 and co 656 and places the larger value on the big output 612 and the smaller value on the small output 614. The ZPS phase initialization estimator uses a divide circuit 616 that takes in two inputs small 614 and big 612 and generates a division output, which forms the input to the arctan circuit 618. The result of the arctan circuit 618 is then sign-adjusted based on the input to the divide circuit 616 to obtain the ZPS estimate 414. The divide and arctan circuits only deal with absolute values of their respective inputs. In addition, the divide circuit 616 orders the inputs according to their magnitudes, and implements the division of the smaller by the bigger. If the magnitudes of si and co are such that co<si, then the ordered division of co/si introduces a 90 degree phase shift that is appropriately compensated to obtain the MAP estimate. If the magnitude of si equals the magnitude of co, then big 612 will equal small 614 and the values are processed accordingly. All these simplifications lead to considerable reductions in the size of the look-up tables needed.

The ZGS gain estimator 624 receives the small signal 614, the big signal 612, and an expected magnitude signal 660. The expected magnitude signal 660 may be a fixed value or a variable that changes for different operating points of the overall magnetic recording system and is a function of various system parameters. Depending on the system, the big signal 612 is determined first to be either si 652 or co 656 which, once chosen, the small signal 614 can be determined to be the value that remains. The amplitide of a sinusoid with in-phase component "co" and out-of-phase component "si" is given by sqrt(si$^2$+co$^2$). This equation can be rewritten as sqrt(big$^2$+small$^2$). Since implementing the functions of squaring and square-root using digital means is difficult, an amplitude estimator of the form x(big)+y(small) is used, where x and y are suitably chosen numbers. Since use of only one such equation leads to a good approximation only for a small range of phases on the sinusoid whose phase is being estimated, two estimators are used. A first estimator z1=x1 (big)+y1(small), a second estimator z2=x2(big)+y2(small), and a circuit is provided to pick the greater of z1 and z2. For good performance and easy digital implementation, it has been determined that x1=1, y1=0.25, x2=0.75 and y2=0.75 are suitable values. The estimated amplitude (Est_amplitude) selects the larger of the two terms, either 'big+0.25small' or '0.75(big+small)'.

Est_amplitude≈max(big+0.25small,0.75(big+small)).
The ZGS estimate is the difference between the Est_amplitude and the expected magnitude 660.

The ZOS estimate 640 is generated by summing the ADC 424 output digital sampled signal 482 over a period of time, for example, corresponding to the time over which the correlation is done that is used in the ZPS phase estimation. The signal component reaches a zero value every 4T when baud-rate samples of the 2T-sinusoid are used, no matter what the input phase is. Therefore, a multiple-of-4 number of samples of the ADC 424 output is accumulated. The accumulated sum is divided by the number of samples 670. The sum of these samples is a noisy version of the DC offset which is used to generate the ZOS signal 640 to adjust the DC offset in the AFE 420.

To arrive at the slope estimates corresponding to the samples of the 2T sinusoid, it is determined whether the received sample is nearest to a positive peak, a zero with negative slope, a negative peak, or a zero with positive slope, referenced as 0, 1, 2, and 3, respectively. The ZPS, ZGS, ZOS unit 408 tries to push the sampling point to the nearest one among these, nearest in the sense of requiring the least change of the ADC sampling points. The ZPS estimate 414 is used in conjunction with the sine and the cosine accumulator outputs si 652 and co 656 to determine whether the ZPS estimate pushed the sampling instant to state 0, 1, 2, or 3. The initial slope computation proceeds in two steps as follows.

Figure 7A:
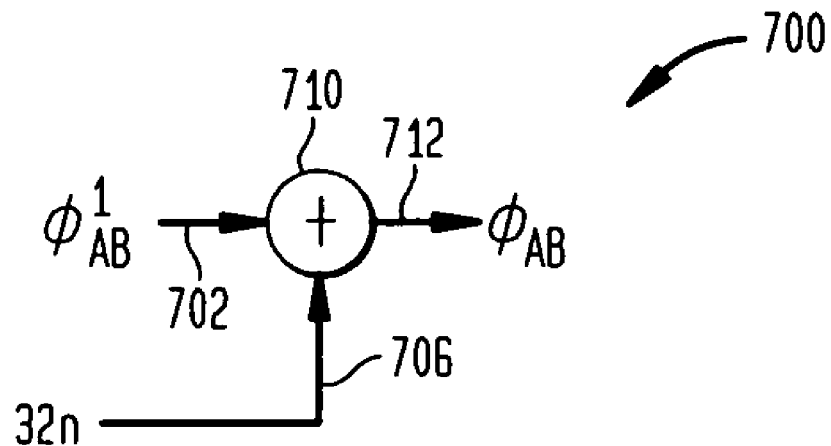
FIG. 7A illustrates a folding circuit in accordance with the present invention.
Figure 8:
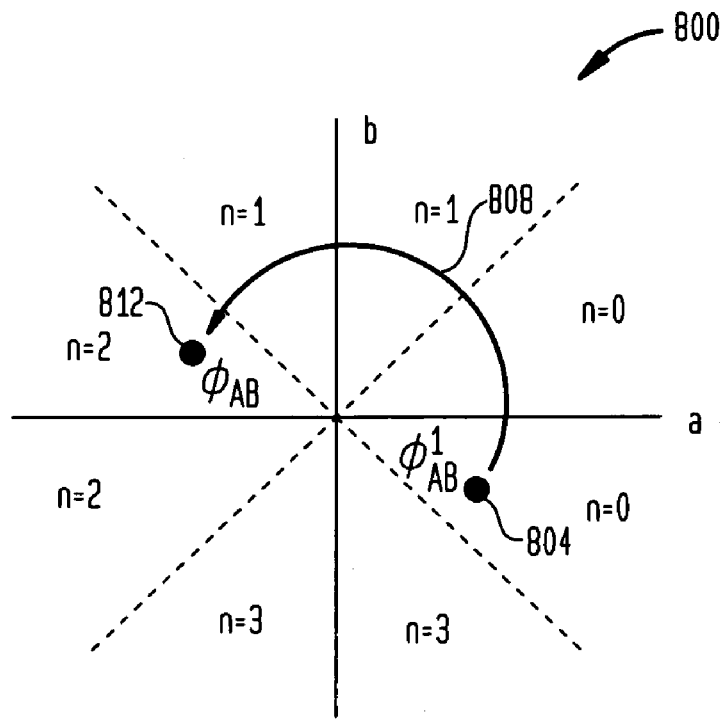
FIG. 8 illustrates a first phase plot showing exemplary results of using the digital rotator in accordance with the present invention.

First step. The sine (si) and cosine (co) accumulators 664 and 668 accumulate ADC samples. The si and co values 652 and 656 represent a point (si, co) that locates the ADC waveform in the 2D plane. However, slope information is needed at the output of the AB filter 444. Therefore, the point (si, co) needs to be rotated in the 2D plane by the angle $\phi_{AB}$ to obtain the point corresponding to AB filter output (si_AB, co_AB). The rotated point is given by si_$AB$=si*cos $\phi_{AB}$−co*sin $\phi_{AB}$ co_$AB$=si*sin $\phi_{AB}$+co*cos $\phi_{AB}$ Using the division circuit 616 and the arctan circuit 618 leads to the folded angle $\phi_{AB}^1$ which is related to $\phi_{AB}$ as follows. In an exemplary implementation, the range (−π/4,π/4) of the phase corresponds to the range [−16,15] of a look-up table of output integers, denoted by nph. Then $\phi_{AB}=\phi_{AB}^1+$32n, where −16≦$\phi_{AB}^1$≦15, and n is an integer chosen based on the relative values of the coefficients a and b of the AB filter 444 as described below. The number 32 used in $\phi_{AB}=\phi_{AB}^1+$32n is based on a total of 4*32_nph units corresponding to 2π radians of the 2T-waveform. This is shown in the folding circuit 700 of FIG. 7A. The angle $\phi_{AB}^1$ 702 is summed with 32n 706 in summer 710 to produce $\phi_{AB}$ 712. Therefore, a phase of $\phi_{AB}$ radians corresponds to $\phi_{AB}$*64/π nph units. This relationship can be seen in a first phase plot 800 shown in FIG. 8, where a phase change term 808 is added to the phase angle $\phi_{AB}^1$ 804 to arrive at the phase $\phi_{AB}$ 812 in the range (−π/4,π4).

Figure 7B:
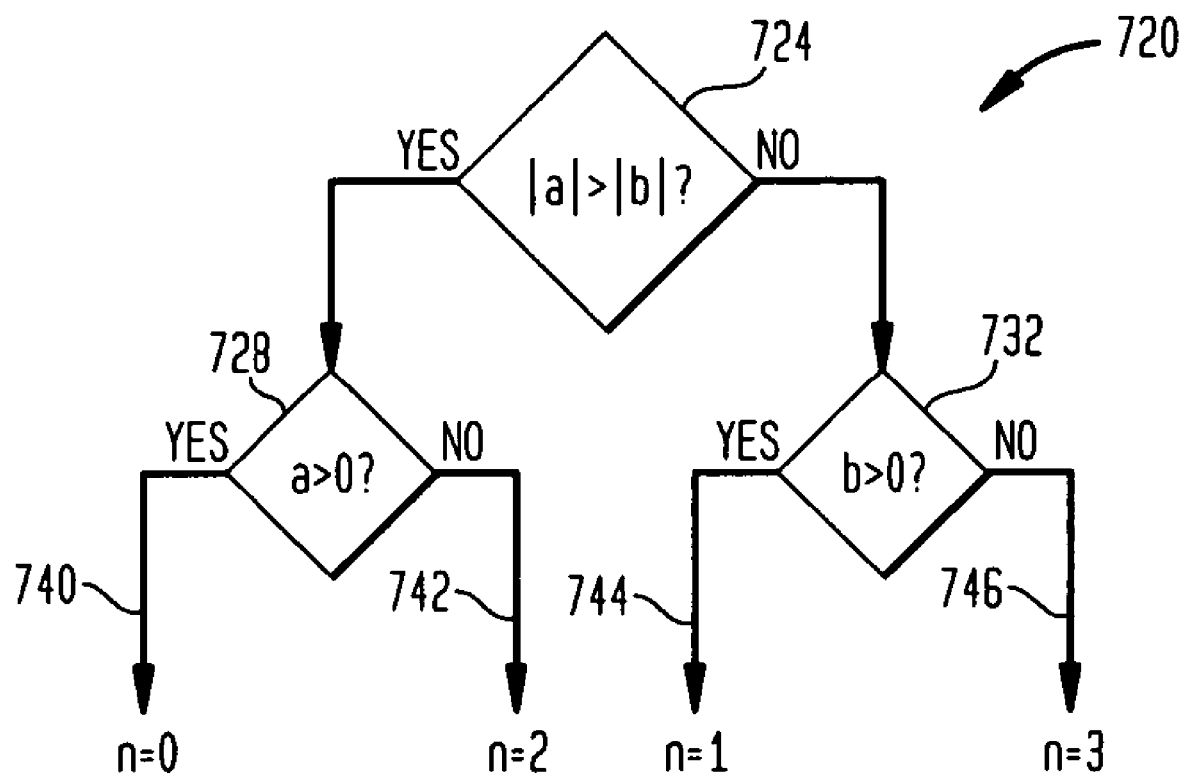
FIG. 7B illustrates a quadrant decision process in accordance with the present invention.

A quadrant decision process 720 form is shown in FIG. 7B. This process can be implemented in an elegant fashion if we take advantage of the fact that the arctan circuit 618 output 414 is a signed number with negative numbers being represented using the 2's complement notation. Let the output of the divide-and-arctan circuitry 414, $\phi_{AB}^1$, be represented by $\phi_{AB}^1=b_4b_3b_2b_1b_0$, where $b_4$ is the sign bit. Let q=$b_6b_5$ denote the quadrant that the AB filter 444 output falls in, as decided based on the signs of a and b, with q=0, 1, 2, or 3 in decimal format represented by n. For example, in a first step 724 the absolute value of a is compared to the absolute value of b. If |a|>|b| then step 728 is followed where it is determined if a>0. If a>0 then it is determined that n=0 in step 740. If a is not greater than zero, then it is determined that n=2 in step 742. In the first step 724 if it was determined that the |a| is not greater than the |b|, then step 732 is followed where it is determined if b>0. If b>0, then it is determined that n=1 in step 744. If b is not greater than zero, then it is determined that n=3 in step 746. Therefore, the phase of the AB filter 444, $\phi_{AB}$, is obtained by simply concatenating q and $\phi AB^1$, i.e., $\phi_{AB}=b_6b_5b_4b_3b_2b_1b_0$.

Once the AB filter angle $\phi_{AB}$ has been determined, the point (si_AB, co_AB) is located in the 2D plane. This location can be determined using the values: si, co, nph, $\phi_{AB}$. Similar to the procedure of getting $\phi_{AB}$ from $\phi_{AB}^1$ described above by quadrant adjustment, a quadrant adjustment to nph can be done based on the values of "si" and "co" to locate it in the 2D plane. Let the corresponding phase of the point (si,co) be nph_2pi. Then, the angular position of (si_AB, co_AB) in the 2D plane is given by nph_AB_2pi=(nph_2pi+$\phi_{AB}$)%128, where the number 128 is the total number of nph units that correspond to a phase change of 2π.

Second step. Based on the angular location of (si_AB, co_AB) in the 2D plane, the nearest among 0, 1, 2, and 3 is chosen as the AB filter output configuration after the ZPS phase adjustment. This can be done simply by using a table with columns of decision boundaries for the quantity nph_AB_2pi, such as Table 1 below.

TABLE 1

| | 1$^{st}$ column | 2$^{nd}$ column | 3$^{rd}$ column | 4$^{th}$ column |
|---|---|---|---|---|
| nph_AB_2pi | [0, 15], [112, 127] | [16, 47] | [48, 79] | [80, 111] |
| configuration | 0 | 1 | 2 | 3 |
| slope assignment | [1 0 −1 0] | [0 1 0 −1] | [−1 0 1 0] | [0 −1 0 1] |

For example, entries in the second column are used if the value of nph_AB_2pi turns out to be between 16 and 47, corresponding to a first configuration or configuration 1. Irrespective of which configuration is determined as an ending configuration, one slope estimate every T is required to be generated. The sequence of slopes that need to be output is referred to as the slope sequence. This slope sequence is a function of the ending configuration. For the configuration 1 example, the slope sequence is [0 1 0 –1] meaning, in the current T duration, the slope estimate is 0, in the next, it is 1, in the one following that, it is 0, in the one after that, it is –1, and this sequence repeats as many times as needed. In this example, the pattern is repeated for 8T since this is the time that is needed for the yss filter 452 to fill and take over the function of the slope estimation. As a consequence, this method is referred to as "initial slope estimation".

Figure 9:
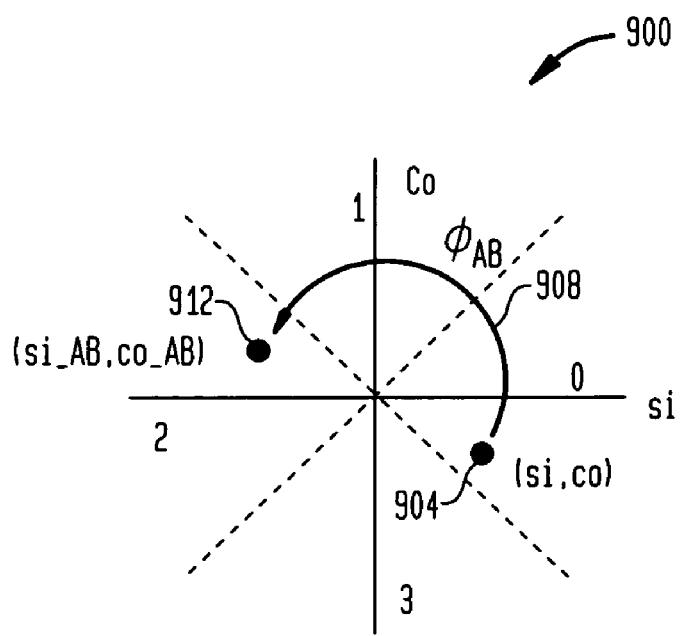
FIG. 9 illustrates a second phase plot showing the results of using the digital rotator method to obtain the phase of an AB filter in two steps in accordance with the present invention.

Once the AB filter output configuration is chosen, then the slope assignment shown in Table 1 can be used to determine the slope sequence to be used. The patterns shown are of length-4 and need to be repeated as needed since the period of the 2T-sinusoid is 4T. This procedure is graphically illustrated in phase plot 900 of FIG. 9, where a phase change term 908 is added to the phase point in the plane (si,co) 904 to arrive at the phase (si_AB,co_AB) 912 in the range ($-\pi,\pi$).

FIG. 10 illustrates a flow chart of a timing acquisition process 1000 using a digital rotator, such as may be used, for example, in a disk recording system. In first step 1010, an analog signal is sampled in an analog to digital converter (ADC) to generate an ADC sampled signal. In step 1020, a zero phase start (ZPS) estimate is generated in a ZPS initialization estimator based on the ADC sampled signal. The ZPS estimate and the ADC sampled signal are then received in a digital rotator in step 1025. Following step 1025, the digital rotator generates a rotated digital sampled signal operating at the ZPS estimate in step 1030. In step 1035, the ZPS estimate and the rotated digital sampled signal are received in a timing error estimator. In step 1040, the ADC is slewed to the ZPS estimate.

A low-latency timing acquisition loop is described for magnetic recording applications that use the 2T-preamble. The timing error estimator allows the acquisition loop to operate even while the ADC is being slewed to the ZPS phase, thus allowing faster loop start-up, eventually leading to better format efficiency.

While the present invention has been disclosed in a presently preferred context, it will be recognized that the present teachings may be adapted to a variety of contexts consistent with this disclosure and the claims that follow.

For example, the present invention is disclosed mainly in the context of perpendicular recording. It will appreciated that it may also be employed with horizontal recording techniques. It will also be appreciated that variations in the particular hardware and software employed are feasible, and to be expected as both evolve with time. For example, an n-tap filter may be used instead of the 2-tap AB filter 444 and a different loop filter may be employed instead of the second-order low pass filter 460. Other variations may include different approaches to determining the slope computations through approaches other than the yss-filter based approached illustrated in FIG. 4. Other such modifications and adaptations to suit a particular design application will be apparent to those of ordinary skill in the art.

We claim:

1. A timing recovery circuit comprising:
   an analog to digital converter (ADC) controller sampling a sinusoid analog signal and generating an ADC digital sampled signal;
   a phase initialization estimator receiving the ADC digital sampled signal and generating a phase estimate;
   a digital rotator receiving the phase estimate and the ADC digital sampled signal and generating a rotated digital sampled signal operating at the phase estimate; and
   a timing error estimator receiving the phase estimate and the rotated digital sampled signal and operating to slew the ADC controller to the phase estimate, wherein the digital rotator comprises:
      rotation logic receiving the phase estimate and a slew control signal and generating a rotation logic signal; and
   an AB filter receiving the ADC digital sampled signal and the rotation logic signal for control of the phase of the AB filter.

2. The timing recovery circuit of claim 1 wherein the ADC controller comprises:
   a sampling controller receiving a slew control signal based on the phase estimate and generating a sampling control signal for controlling ADC sampling points; and
   an ADC receiving the analog signal, receiving the sampling control signal, and generating the ADC digital sampled signal.

3. The timing recovery circuit of claim 1 wherein the phase initialization estimator comprises:
   a sine correlator producing an output si;
   a cosine correlator producing an output co;
   a divide unit generating an output si/co; and
   an arctan unit receiving the output si/co and generating the phase estimate therefrom.

4. The timing recovery circuit of claim 3 wherein the phase initialization estimator further comprises:
   a pick big and small circuit comparing si and co and selecting the max(si,co) as the big output and the min(si,co) as the small output;
   the divide unit generating min(si,co)/max(si,co); and
   the arctan unit receiving min(si,co)/max(si,co) and generating the phase estimate therefrom.

5. The timing recovery circuit of claim 1, wherein the rotation logic comprises:
   a rotator initializer receiving the phase estimate and the slew control signal and generating a rotator control signal; and
   an integrator receiving the rotator control signal and generating the rotation logic signal.

6. The timing recovery circuit of claim 5 wherein the rotator initializer comprises:
   a gain delay unit receiving the slew control signal and generating a delayed slew control signal;
   a summer switcher receiving the delayed slew control signal, receiving the phase estimate, subtracting the delayed slew control signal from the phase estimate to generate a difference signal, and connecting the difference signal as the rotator control signal until the operation to slew the ADC controller is complete.

7. The timing recovery circuit of claim 6 wherein the gain delay unit delays the slew control signal by a delay matched to the delay of the ADC controller.

8. The timing recovery circuit of claim 1 wherein the timing error estimator comprises:
   a phase error detector (PED) controller receiving the rotated digital sampled signal and an initial slope signal and generating a phase error signal;
   a loop filter receiving the phase error signal and generating a filtered phase error signal; and
   a slew-box receiving the filtered phase error signal and the phase estimate and generating
   a slew control signal.

9. The timing recovery circuit of claim 8 wherein the PED controller comprises:
- an n-tap filter receiving the rotated digital sampled signal and generating a filtered signal;
- a slope computation unit receiving the filtered signal and generating a slope estimate signal; and
- a PED receiving the rotated digital sampled signal, the slope estimate signal, the initial slope signal and generating the phase error signal.

10. A timing recovery circuit, comprising:
- an analog to digital converter (ADC) controller which samples an analog signal and generates a sampled signal; and
- a digital rotator receiving the sampled signal and generating digitally controlled phase changes in a rotated sampled signal to compensate for delays and slewing of the ADC controller, wherein the digital rotator functions to snap to a zero phase start (ZPS) estimate and to derotate in step with slewing the ADC controller so that the phase of the rotated sampled signal remains at the ZPS estimate through the ADC controller slewing operation.

11. The timing recovery circuit of claim 10 wherein the ADC controller comprises:
- an ADC which receives the analog signal generated from detecting sinusoidal waveform generating symbols and a slew control signal to slew the ADC sampling points to a zero phase start estimate.

12. The timing recovery circuit of claim 10, further comprising:
- an analog front end (AFE) that receives a signal for amplification and a zero gain start (ZGS) signal and generates the analog signal based on the ZGS signal; and
- a ZGS gain estimator that receives a large signal and a small signal from a magnitude comparison of a sine correlation of the sampled signal and a cosine correlation of the sampled signal and receives an expected magnitude signal wherein the ZGS estimator generates the ZGS signal based on the large, small, and expected magnitude signals.

13. A method for timing acquisition of signals in a disk recording system, the method comprising:
- sampling an analog signal in an analog to digital converter (ADC) to generate an ADC sampled signal;
- generating a zero phase start (ZPS) estimate in a ZPS initialization estimator based on the ADC sampled signal;
- receiving the ZPS estimate and the ADC sampled signal in a digital rotator;
- rotating the ADC sampled signal in the digital rotator to generate a rotated sampled signal operating at the ZPS estimate;
- slewing the ADC to the ZPS estimate; and
- derotating the ADC sampled signal in the digital rotator in step with the slewing the ADC so that the phase of the rotated sampled signal remains at the ZPS estimate through the slewing.

14. The method of claim 13 further comprising:
- receiving the ZPS estimate and the rotated sampled signal in a timing error estimator.

15. The method of claim 13 wherein the step of generating the ZPS estimate comprises:
- correlating the ADC sampled signal by baud-rate samples of a sine and cosine at a nominal detected sinusoidal frequency producing si and co signals;
- dividing the si signal by the co signal; and
- calculating the phase of the ADC sampled signal by taking the arctan of (si/co).

16. The method of claim 15 wherein the step of generating the ZPS estimate further comprises:
- picking a larger value and a smaller value of the si and co signals;
- dividing the smaller value by the larger value to produce a division result; and
- taking the arctan of the division result.

17. The method of claim 15 further comprising:
- amplifying a signal based on a received zero gain start (ZGS) signal to produce the analog signal; and
- generating the ZGS signal based on an expected magnitude signal and a signal based on larger and smaller values of the si and co signals.

18. The method of claim 13, further comprising:
- generating a delayed slew control signal;
- generating a difference signal that is the difference between the delayed slew control signal and the ZPS estimate, wherein the step of derotating comprises
- derotating the ADC sampled signal in the digital rotator by use of the difference signal during an initialization timing acquisition period.

19. A timing recovery circuit, comprising:
- an analog to digital converter (ADC) controller sampling a sinusoid analog signal and generating an ADC digital sampled signal;
- a phase initialization estimator receiving the ADC digital sampled signal and generating a phase estimate;
- a digital rotator receiving the phase estimate and the ADC digital sampled signal and generating a rotated digital sampled signal operating at the phase estimate; and
- a timing error estimator receiving the phase estimate and the rotated digital sampled signal and operating to slew the ADC controller to the phase estimate, wherein the timing error estimator comprises:
  - a phase error detector (PED) controller receiving the rotated digital sampled signal and an initial slope signal and generating a phase error signal;
  - a loop filter receiving the phase error signal and generating a filtered phase error signal; and
  - a slew-box receiving the filtered phase error signal and the phase estimate and generating a slew control signal, wherein the PED controller comprises:
    - an n-tap filter receiving the rotated digital sampled signal and generating a filtered signal;
    - a slope computation unit receiving the filtered signal and generating a slope estimate signal; and
    - a phase error detector receiving the rotated digital sampled signal, the slope estimate signal, the initial slope signal and generating the phase error signal.

20. A timing recovery circuit, comprising:
- an analog to digital convener (ADC) controller which samples an analog signal and generates a sampled signal;
- a digital rotator receiving the sampled signal and generating digitally controlled phase changes in a rotated sampled signal to compensate for delays and slewing of the ADC controller;
- an analog front end (AFE) that receives a signal for amplification and a zero gain start (ZGS) signal and generates the analog signal based on the ZGS signal; and
- a ZGS gain estimator that receives a large signal and a small signal from a magnitude comparison of a sine correlation of the sampled signal and a cosine correlation of the sampled signal and receives an expected magnitude signal wherein the ZGS estimator generates the ZGS signal based on the large, small, and expected magnitude signals.

21. A method for timing acquisition of signals in a disk recording system, the method comprising:
   sampling an analog signal in an analog to digital converter (ADC) to generate an ADC sampled signal;
   generating a zero phase start (ZPS) estimate in a ZPS initialization estimator based on the ADC sampled signal;
   receiving the ZPS estimate and the ADC sampled signal in a digital rotator; and
   generating a rotated sampled signal operating at the ZPS estimate, wherein:
   the step of generating the ZPS estimate comprises:
      correlating the ADC sampled signal by baud-rate samples of a sine and cosine at a nominal detected sinusoidal frequency producing si and co signals;
      dividing the si signal by the co signal; and
      calculating the phase of the ADC sampled signal by taking the arctan of (si/co); and
   the method further comprises:
      amplifying a signal based on a received zero gain start (ZGS) signal to produce the analog signal; and
      generating the ZGS signal based on an expected magnitude signal and a signal based on larger and smaller values of the si and co signals.

* * * * *